(12) United States Patent
Senda et al.

(10) Patent No.: US 9,133,741 B2
(45) Date of Patent: Sep. 15, 2015

(54) FREEZE PREVENTION ARRANGEMENT FOR PCV CHANNEL AND INTAKE MANIFOLD

(71) Applicant: AISIN SEIKI KABUSHIKI KAISHA, Kariya-shi (JP)

(72) Inventors: Tomohisa Senda, Kariya (JP); Hideaki Teramoto, Kariya (JP)

(73) Assignee: AISIN SEIKI KABUSHIKI KAISHA, Kariya-shi, Aichi (JP)

( * ) Notice: Subject to any disclaimer, the term of this patent is extended or adjusted under 35 U.S.C. 154(b) by 0 days.

(21) Appl. No.: 14/357,436

(22) PCT Filed: Nov. 29, 2012

(86) PCT No.: PCT/JP2012/080891
§ 371 (c)(1),
(2) Date: May 9, 2014

(87) PCT Pub. No.: WO2013/111450
PCT Pub. Date: Aug. 1, 2013

(65) Prior Publication Data
US 2014/0326226 A1 Nov. 6, 2014

(30) Foreign Application Priority Data
Jan. 25, 2012 (JP) .................................. 2012-013263

(51) Int. Cl.
*F01M 13/00* (2006.01)
*F02M 35/10* (2006.01)
(Continued)

(52) U.S. Cl.
CPC ........... *F01M 13/0011* (2013.01); *F01M 13/00* (2013.01); *F02M 25/06* (2013.01);
(Continued)

(58) Field of Classification Search
CPC .................. F02M 35/10209; F02M 35/10222; F02M 35/06; F02M 31/08; F02M 31/087; F01M 13/00; F01M 2013/0038

USPC ................. 123/41.86, 572, 573, 574, 196 CP, 123/198 P, 568.11, 568.12
See application file for complete search history.

(56) References Cited

U.S. PATENT DOCUMENTS 6,390,080 B1 * 5/2002 Dowding et al. ............. 123/572
6,553,978 B2 * 4/2003 Takashiba ................ 123/568.15
(Continued)

FOREIGN PATENT DOCUMENTS

| JP | 57-117753 U | 7/1982 |
| JP | 57-195813 A | 12/1982 |

(Continued)

OTHER PUBLICATIONS

Notification of Transmittal of Translation of the International Preliminary Report on Patentability (Chapter I or Chapter II)(PCT/IB/338) and International Preliminary Report on Patentability (Form PCT/IB/373) and Written Opinion of the International Searching Authority for International (Translation)(Form PCT/ISA/237) issued on Aug. 7, 2014, in corresponding International Application No. PCT/JP2012/080891. (7 pages).

(Continued)

*Primary Examiner* — Lindsay Low
*Assistant Examiner* — Grant Moubry
(74) *Attorney, Agent, or Firm* — Buchanan Ingersoll & Rooney PC

(57) ABSTRACT

Provided are an arrangement capable of reliably preventing freeze of a PCV channel without requiring additional piping and an intake manifold having this arrangement. This arrangement for freeze prevention of a PCV channel includes a PCV channel returning blowby gas containing un-combusted fuel gas as a main component thereof and leaked into an engine to an intake port, an EGR channel returning exhaust gas exhausted from the engine to the intake port, and a heating portion as a common portion between a PCV outer wall of the PCV channel and an EGR outer wall of the EGR channel.

14 Claims, 3 Drawing Sheets

(51) Int. Cl.
*F02M 35/112* (2006.01)
*F02M 31/135* (2006.01)
*F02M 25/06* (2006.01)
*F02M 25/07* (2006.01)
*F02M 31/08* (2006.01)

(52) U.S. Cl.
CPC ....... *F02M25/0747* (2013.01); *F02M 31/0815* (2013.01); *F02M 31/135* (2013.01); *F02M 35/10222* (2013.01); *F02M 35/10268* (2013.01); *F02M 35/10321* (2013.01); *F02M 35/112* (2013.01); *F01M 2013/0027* (2013.01)

(56) References Cited

U.S. PATENT DOCUMENTS

| | | | | |
|---|---|---|---|---|
| 6,604,506 | B2* | 8/2003 | Tanaka et al. | 123/336 |
| 7,198,040 | B2* | 4/2007 | Noda et al. | 123/572 |
| 8,887,703 | B2* | 11/2014 | Valencia et al. | 123/572 |
| 2012/0138030 | A1* | 6/2012 | Yang | 123/574 |

FOREIGN PATENT DOCUMENTS

| | | | |
|---|---|---|---|
| JP | 3-68554 U | 7/1991 | |
| JP | 4-203405 A | 7/1992 | |
| JP | 2008-215191 A | 9/2008 | |
| JP | 2009-127543 A | 6/2009 | |
| JP | 2010-65575 A | 3/2010 | |
| JP | 2010-84640 A | 4/2010 | |
| JP | 2010285937 A * | 12/2010 | |
| KR | 20070117088 A * | 12/2007 | ............ F01M 13/00 |

OTHER PUBLICATIONS

International Search Report (PCT/ISA/210) mailed on Feb. 26, 2013, by the Japanese Patent Office as the International Searching Authority for International Application No. PCT/JP2012/080891.

Written Opinion (PCT/ISA/237) mailed on Feb. 26, 2013, by the Japanese Patent Office as the International Searching Authority for International Application No. PCT/JP2012/080891.

* cited by examiner

FREEZE PREVENTION ARRANGEMENT FOR PCV CHANNEL AND INTAKE MANIFOLD

TECHNICAL FIELD

The present invention relates to a freeze prevention arrangement for a PCV channel in which blowby gas flows and also to an intake manifold having the freeze prevention arrangement.

BACKGROUND ART

An engine obtains power by rotation of a crankshaft caused by combustion of mixture gas in a combustion chamber. However, not all of the mixture gas introduced to the combustion chamber is combusted. A portion of the mixture gas leaks through a gap between a piston and a cylinder into a crankcase. This leaked gas is called blowby gas. Blowby gas as un-combusted fuel gas contains air pollutant in a high concentration. Therefore, discharging it as it is as an exhaust gas into the atmosphere is legally prohibited. Accordingly, an arrangement is provided for returning blowby gas to an intake port side via a PCV (Positive Crankcase Ventilation) channel, so that it is combusted with an amount of newly supplied mixture gas in the combustion chamber and then discharged into the atmosphere.

PTL 1 discloses an arrangement wherein gas inlets for introducing blowby gas are opened in pipe walls of a plurality of intake pipes and a gas introducing channel for distributing the blowby gas is connected to the gas inlets via a gas introducing chamber housing. The lower face of the inside of the gas introducing chamber housing is inclined downwards toward the gas inlets and the lower edge of the lower face is located at a position higher than the intake pipe side of the gas inlets. With this arrangement, water present inside the gas introducing chamber housing is caused to flow along the lower face of the inside of the gas introducing chamber housing to reach the gas inlets of the intake pipes and and then to flow along the lower edges of the gas inlets to enter the intake pipes.

PTL 2 discloses an arrangement in which a heating pipe is rigidly attached to an outer circumference of an insertion pipe constituting a portion of a PCV channel and engine cooling water is caused to flow inside the heating pipe. As the engine cooling water flowing inside the heating pipe has a high temperature, this raises the temperature of blowby gas flowing inside the insertion pipe, thus preventing freezing of steam contained in the blowby gas flowing in the PCV channel.

CITATION LIST

Patent Literature

PTL 1: Japanese Unexamined Patent Application Publication No. 2010-84640
PTL 2: Japanese Unexamined Patent Application Publication No. 2008-215191

SUMMARY OF INVENTION

Technical Problem

As blowby gas is un-combusted fuel gas, its gas temperature is low and a large amount of water is contained therein. In an intake stroke of an engine, mixture gas is introduced rapidly into the combustion chamber, so that inside an intake port, there occurs a state of adiabatic expansion due to a negative pressure, which reduces the temperature of the intake port. Further, the air flowing in the intake port is ambient air. So, in the case of a low outside temperature, in particular, ambient air having a low temperature flows in the intake port, thus reducing the temperature of the intake port. If the temperature of the intake port is reduced in this way, the blowby gas too is cooled at the entrance of the intake port. With this cooling of blowby gas, water contained in the blowby gas is frozen. Then, in the worst case, there is possibility of frozen water (ice) blocking the PVC channel.

In the case of the arrangement of PTL 1, water present inside the gas introducing chamber housing flows into the intake port, so water will not stay there and will not freeze, either. However, if dew condensation occurs on the wall surface of the gas introducing channel and the water fails to enter the gas introducing chamber housing, freezing may occur on the wall surface, thus blocking the gas introducing channel. Therefore, the arrangement of PTL 1 cannot be said to provide complete prevention of gas introducing channel blockage. The arrangement of PTL 2 is effective for freeze prevention of the PCV channel. However, this arrangement is complicated as requiring provision of the additional heating pipe, so there was possibility of cost increase.

In view of the above-described problems, the object of the present invention is to provide an arrangement capable of reliably preventing freeze of a PCV channel without requiring additional piping and also to provide an intake manifold having this arrangement.

Solution to Problem

For achieving the above-noted object, according to a characterizing feature of an arrangement for freeze prevention of a PCV channel relating to the present invention, the arrangement comprises:

a PCV channel returning blowby gas containing un-combusted fuel gas as a main component thereof and leaked into an engine to an intake port;

an EGR channel returning exhaust gas exhausted from the engine to the intake port; and a heating portion as a common portion between a PCV outer wall of the PCV channel and an EGR outer wall of the EGR channel.

Exhaust gas from a combustion chamber has a high temperature and will still have a high temperature of 100° C. approximately even after being cooled by an EGR cooler. On the other hand, blowby gas as un-combusted gas has a low temperature. Then, if the blowby gas flowing in the PCV channel is heated by the heat of exhaust gas, the temperature of the blowby gas is raised, so even when this is returned and introduced into the intake port, no freezing of water contained in the blowby gas will occur. For efficient transfer of the heat of exhaust gas to blowby gas, the EGR channel and the PCV channel should be disposed as closely as possible to each other. However, if mixing of gases should occur between the exhaust gas and the blowby gas, this will result in solidification of impurities in the exhaust gas, which then will be accumulated as "sludge". Therefore, there is a need for ensuring efficient heat transfer while keeping the channels separate from each other. To this end, it is advantageous for the arrangement to include a heating portion as a common portion between a PCV outer wall of the PCV channel and an EGR outer wall of the EGR channel.

With implementation of such arrangement, the EGR channel and the PCV channel are separated from each other via a single wall present therebetween. Accordingly, it becomes possible to transfer the heat of exhaust gas to blowby gas in an efficient manner.

In the freeze prevention arrangement for a PCV channel relating to the present invention, preferably, the heating portion is disposed at a position which is upstream of and adjacent to a blowby gas inlet through which the blowby gas is introduced to the respective intake port.

Even if blowby gas is heated with the heat of exhaust gas, as it leaves the EGR channel, the temperature of the blowby gas will fall. Then, with the above arrangement of disposing the heating portion at a position adjacent to the blowby gas inlet, it becomes possible to cause the heated blowby gas with keeping its high temperature to reach the blowby gas inlet. As a result, there will occur no freezing of water content in the blowby gas at the blowby gas inlet or no blockage of the PCV channel, either.

In the freeze prevention arrangement for a PCV channel relating to the present invention, preferably, the PCV channel includes a common channel portion which is a single channel and a branch channel portion which branches from the common channel portion and which is connected to the intake port; and wherein the heating portion is provided in the common channel portion.

For efficient heat transfer from the EGR channel, it is effective to increase the area of the heating portion. In doing so, however, if too much importance is placed on the area increase of the heating portion, this may lead to increase of complexity of the structure of the heating portion, thus inviting cost increase. Normally, the EGR channel is disposed linearly to be oriented perpendicularly relative to each intake port. Therefore, if the PCV channel is formed straight and disposed parallel with the EGR channel, it is possible to secure a sufficient area for the heating portion with a simple arrangement. Thus, with the arrangement of heating the whole blowby gas with utilizing the common channel portion which is a single channel as the heating portion, heating efficiency is improved and also it becomes readily possible to obtain a PCV channel having a heating portion with a large area.

In the freeze prevention arrangement for a PCV channel relating to the present invention, preferably, at least a portion of the EGR channel is provided between the PCV channel and an intake channel connected to the intake port.

With the above-described arrangement, it is possible to restrict discharge to the outside of the heat of the exhaust gas which is a high-temperature gas flowing in the EGR channel. That is, as the above arrangement allows transfer of the heat of the exhaust gas to both the PCV channel and the intake channel, discharge of heat to the outside can be restricted.

Preferably, an intake manifold having the freeze prevention arrangement for a PCV channel relating to the present invention is formed integral with the PCV channel and the EGR channel.

Recently, heat resistance of resins has improved, which improvement allows forming an intake manifold, a PCV channel, an EGR channel of a resin. Then, if the PCV channel and the EGR channel are formed integral with the body of the intake manifold, this will reduce the number of assembly steps. As a result, it becomes possible to provide an intake manifold having the inventive freeze prevention arrangement for a PCV channel at low costs.

DESCRIPTION OF EMBODIMENTS

[First Embodiment]

Figure 1:
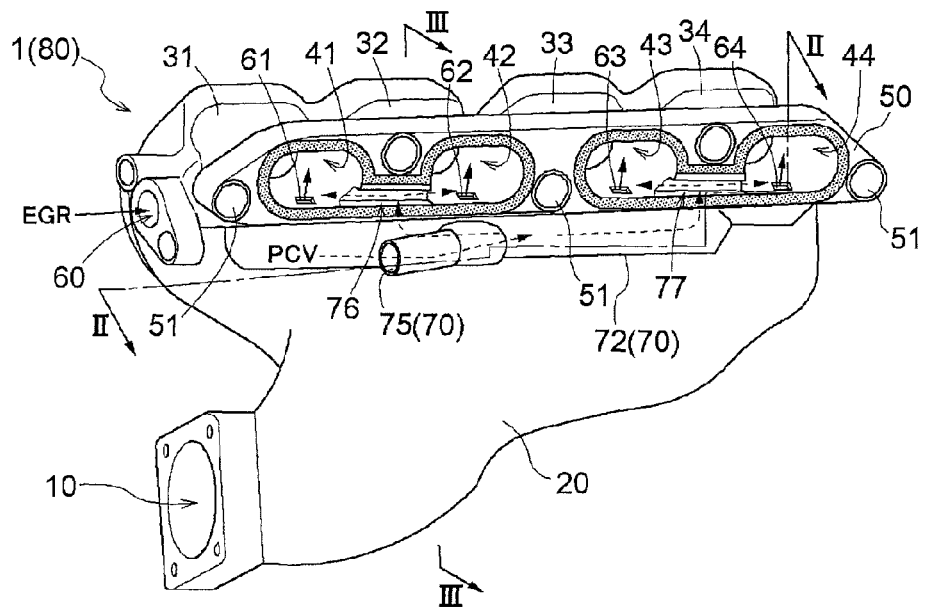
[FIG. 1] is a perspective view showing an outer appearance of an intake manifold having a freeze prevention arrangement for a PCV channel relating to a first embodiment.
Figure 2:
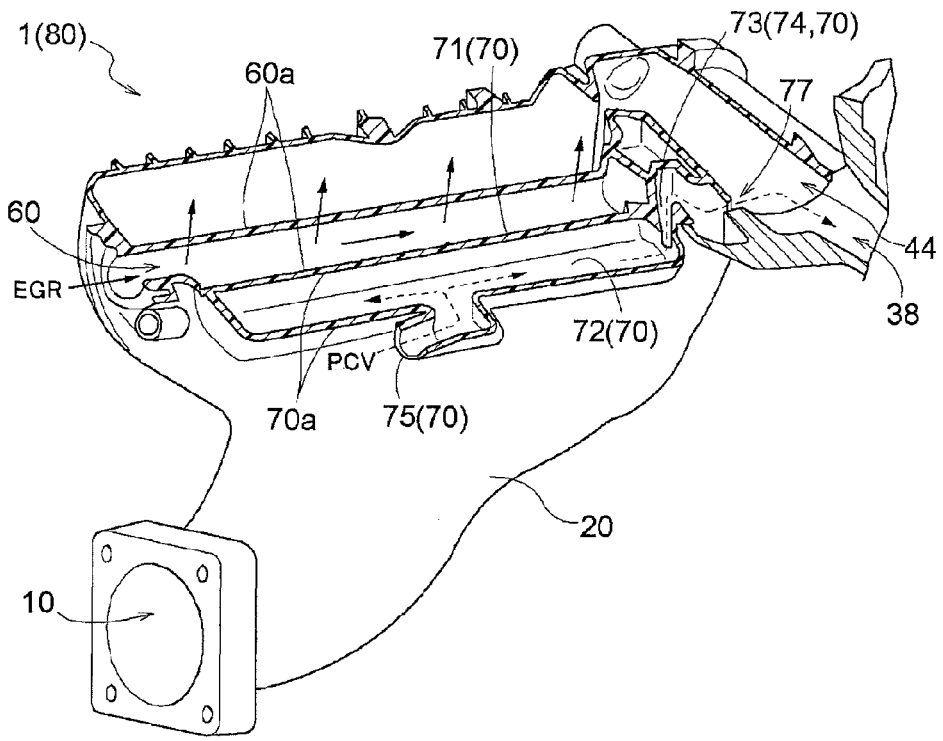
[FIG. 2] is a section view taken along a line II-II in FIG. 1.
Figure 3:
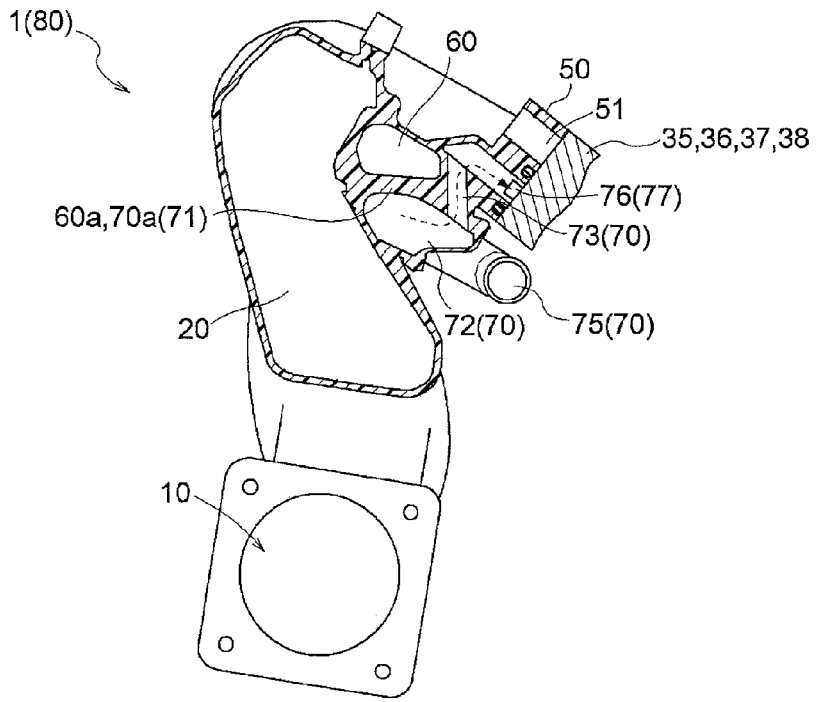
[FIG. 3] is a section view taken along a line III-III in FIG. 1.

Next, embodiments of the present invention will be described in details with reference to the drawings. FIG. 1 is a perspective view showing an outer appearance of an intake having a freeze prevention arrangement for a PCV channel relating to a first embodiment. FIG. 2 is a section view taken along a line II-II in FIG. 1. FIG. 3 is a section view taken along a line III-III in FIG. 1.

An intake manifold 1 is used in an inline four-cylinder engine 80 (this may be referred to also as "engine 80" hereinafter). The intake manifold 1 is formed integral of a synthetic resin. As this synthetic resin, in consideration to such factors as strength, weight, moldability, etc., a synthetic resin comprised of a mixture of polyamide resin (PA6) and glass fiber is used for example. The principal function of the intake manifold 1 is to distribute air to the respective cylinders evenly. Air is suctioned through the intake manifold 1 into a respective combustion chamber due to a negative pressure developed within the combustion chamber in an intake stroke of the piston of the engine 80.

As shown in FIG. 1, the intake manifold 1 includes an intake pipe 10, a surge tank 20 connected to the intake pipe 10, four intake channels branching from the surge tank 20, i.e. an intake channel 31, an intake channel 32, an intake channel 33, and an intake channel 34, and a flange 50 formed at terminal ends of the intake channels 31-34 (generic reference to the intake channel 31, the intake channel 32, the intake channel 33 and the intake channel 34).

The intake pipe 10 shown in FIG. 2 has a shape of a cylindrical body having an aperture. The aperture side of the intake pipe 10 is air-tightly fastened to an unillustrated throttle body by means of bolts or the like. An amount of air introduced from the outside of the vehicle is fed via the throttle body to the intake pipe 10. The intake pipe 10 is communicated on its downstream side to the surge tank 20 and feeds the air into the surge tank 20.

The surge tank 20 is provided for temporarily storing the air fed from the intake pipe 10. The surge tank 20 forms a single space having a large capacity, so that this can reduce pressure pulsation or intake interference of air introduced through the intake pipe 10 and it can also render even the amounts of air to be fed to the respective intake channels 31-34.

The intake channels 31-34 are provided for feeding the air stored in the surge tank 20 in distribution to combustion chambers (not shown) of the respective cylinders of the engine 80. The intake channels 31-34 respectively branch from the surge tank 20 in a smooth manner. As shown in FIG. 3, from the surge tank 20 to the intake channels 31-34, the manifold 1 is curved at an acute angle.

The flange 50 is provided for providing air-tight fastening of the intake channels 31-34 to intake ports 35, 36, 37, 38 of the respective cylinders. As shown in FIG. 1, the flange 50 is formed integral with circumferences of an air outlet 41 as the terminal end of the intake channel 31, an air outlet 42 as the terminal end of the intake channel 32, an air outlet 43 as the terminal end of the intake channel 33, and an air outlet 44 as the terminal end of the intake channel 34. In the circumferential edges of the air outlets 41, 42, 43, 44 of the flange 50, five flange fastening holes 51 are opened for allowing the fastening to the intake ports 35-38 of the respective cylinders.

As shown in FIG. 1, the intake manifold 1 includes an EGR channel 60 which is formed on the inner side of the curves of the intake channels 31-34 and along a direction perpendicular to the direction along which these intake channels 31-34 extend. And, inside the EGR channel 60, exhaust gas (to be referred to as "EGR gas" also when appropriate) is caused to flow. As shown in FIG. 2 and FIG. 3, the EGR channel 60 is formed integral with the intake manifold 1. Adjacent the air outlet 41, there is provided an EGR inlet 61 for introducing EGR gas into the intake channel 31. Adjacent the air outlet 42, there is provided an EGR inlet 62 for introducing EGR gas into the intake channel 32. Adjacent the air outlet 43, there is provided an EGR inlet 63 for introducing EGR gas into the intake channel 33. Adjacent the air outlet 44, there is provided an EGR inlet 64 for introducing EGR gas into the intake channel 34. Four EGR inlets in total, that is, one for each cylinder, are provided. The details of EGR will be given later herein.

The term: EGR is short for Exhaust Gas Recirculation and refers to a technique or a device for recirculating a portion of exhaust gas after combustion in and exhaust from a combustion chamber to the intake side. EGR is effected mainly for reduction of nitrogen oxides in exhaust gas. If combustion is effected with exhaust gas being mixed in freshly introduced air, inactive substances contained in the exhaust gas act to slow down the combustion, so that the combustion peak temperature can be lowered. Further, exhaust gas, since it has been once combusted, contains lower content of oxygen. With these in combination, it is possible to restrict generation of nitrogen oxides that could easily be generated in combustion under a high-temperature and oxygen-rich environment.

Post-combustion exhaust gas discharged from a combustion chamber is introduced through an exhaust gas inlet provided in an exhaust port and is caused to flow within the EGR channel 60. Since the temperature of the exhaust gas is very high (several hundreds ° C.), this temperature of exhaust gas is lowered by an unillustrated EGR cooler. After passage through the EGR cooler, the temperature of exhaust gas will be lower than 120° C. Thereafter, the exhaust gas flows further in the EGR channel 60 and enters the intake channels 31-34 via the EGR inlets 61, 62, 63, 64 of the intake manifold 1 and flows through the intake ports 35-38 to enter the combustion chambers again.

The intake manifold 1 further includes a PCV channel 70 which is disposed at a position adjacent the EGR channel 60 and to have its gas passage direction parallel therewith. The PVC channel 70 is bonded to the intake manifold body by vibration welding technique and formed integral with the intake manifold 1. Here, the language "formed integral" is used to mean not only that the PVC channel 70 and the EGR channel 60 and the intake manifold body are manufactured by one time molding operation into a single unit (intake manifold 1), but also that the intake manifold body having the PCV channel 70 and the EGR channel 60 is bonded through welding to be formed into the intake manifold 1 as a single unit. Needless to say, the language is used to mean also a case wherein the PVC channel 70 and the EGR channel 60 and the intake manifold body are all manufactured as separate units and these are bonded to each other through e.g. welding to form the intake manifold 1.

To one end 75 of the PCV channel 70, an unillustrated PCV pipe is connected and the other end of the PCV pipe is connected to an unillustrated crankcase. Blowby gas inside the crankcase is caused to flow inside the PCV pipe and to enter the PCV channel 70 via the end 75.

The PCV channel 70 includes a common channel portion 72 which is a single channel, and two branch channel portions 73, 74 branching from the common channel portion 72. The branch channel portions 73, 74, as shown in FIGS. 2 and 3, are formed to extend upwards from the common channel portion 72. At the ends of the two branch channel portions 73, 74 opposite the common channel portion 72, there are formed blowby gas inlets 76, 77. The blowby gas inlet 76 is disposed adjacent the air inlets 41, 42 and between the EGR inlets 61, 62. The blowby gas inlet 77 is disposed adjacent the air inlets 43, 44 and between the EGR inlets 63, 64. Further, an outer wall 70a of the PCV channel 70 and an outer wall 60a of the EGR channel 60 share a common portion. In the following discussion, this common portion of the outer walls 60a, 70a will be referred to as a heating portion 71. The heating portion 71 is a portion of the common channel portion 72.

Next, circulation of the blowby gas will be explained. Blowby gas introduced from the crankcase via the PCV pipe into the PCV channel 70 enters the common channel portion 72 first and flows therein. Since the temperature of EGR gas flowing in the EGR channel 60 has a higher temperature than the blowby gas, as the blowby gas flows in the common channel portion 72, the blowby gas is heated by the heat conducted via the heating portion 71 of the EGR gas flowing in the EGR channel 60, whereby the temperature of the blowby gas is raised. While the engine 80 is operating, EGR gas and blowby gas are constantly circulated also, so that the blowby gas is constantly heated.

The heated blowby gas flows from the common channel portion 72 to the branch channel portion 73 and then is introduced via the blowby gas inlets 76, 77 into the intake channels 31-34. This introduced blowby gas is converged with air flowing in the intake channels 31-34 and fed together into the combustion chambers. If the outside (ambience) temperature is low and the temperature of the air flowing in the intake channels 31-34 is low, the temperature adjacent the blowby gas inlets 76, 77 will be lowered. Moreover, as the air flowing in the intake channels 31-34 has a high velocity, if the blowby gas keeps its low temperature, there can occur freezing of water content adjacent the blowby inlets 76, 77. On the other hand, according to the freeze prevention arrangement of the instant embodiment, as the blowby gas is heated, thus having a high temperature, even when the temperature adjacent the blowby gas inlets 76, 77 is low and the flowing air has a high velocity, there occurs no cooling to such an extent as to cause freezing of the water content in the blowby gas. As a result, there is no possibility of blockage of the branch channel portion 73 (PCV channel portion 70).

As described above, with the freeze prevention arrangement for a PCV channel according to the instant embodiment, in the case of the intake manifold 1 having the EGR channel 60, the arrangement requires only disposing the PCV channel 70 at the position adjacent the EGR channel 60. Thus, there is no need to provide any additional warm water pipe for heating the PCV channel 70, so that freeze prevention is made possible inexpensively. Further, with the inventive freeze prevention arrangement, as there is no possibility of blockage of the PCV channel 70 by freezing, there is no restraint such as water draining by inclining the channel. Hence, there is high degree of designing freedom for the intake manifold 1.

In order to introduce the blowby gas with a high temperature to the intake channels 31, 34, the lengths of the branch channel portions 73, 74 should be short and also the blowby gas inlets 76, 77 too should be disposed in close vicinity of the terminal end of the intake manifold 1, that is, in close vicinity of the air outlets 41-44. That is, it is advantageous for the heating portion 71 to be disposed at a position upstream-wise adjacent the blowby gas inlets 76, 77. Further, it is advantageous for the heating portion 71 to have as large as possible area and for its wall face to have as small as possible thickness, because such arrangement allows a greater amount of heat to be conducted from the EGR gas, thus enhancing the heating effect. As shown in FIG. 2, in the instant embodiment, an arrangement is provided such that the whole flow direction of the common channel portion 72 excluding the branch channel portion 73 is aligned in contact with the EGR channel 60.

In this embodiment, the flowing direction of the EGR gas is set same as that of the blowby gas. However, these flow directions may be set opposite to each other.

[Second Embodiment]

Figure 4:
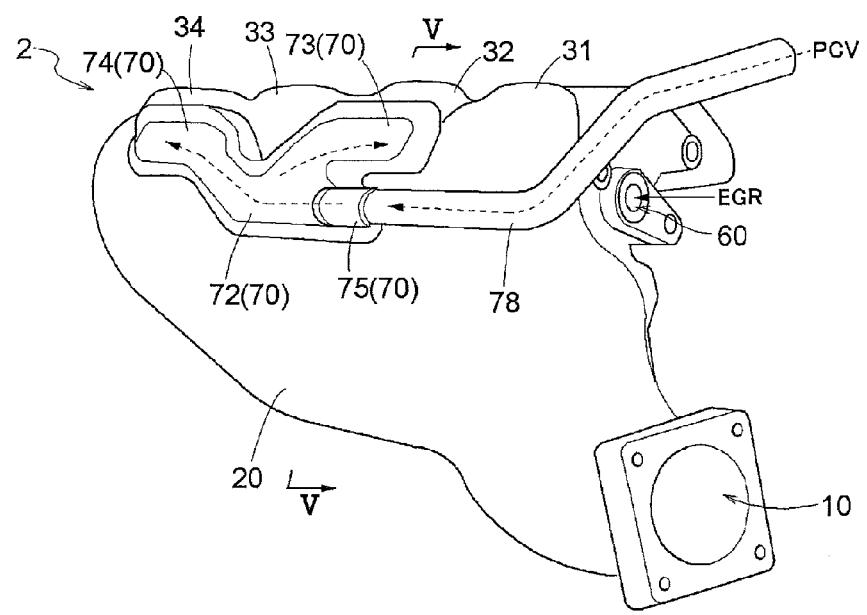
[FIG. 4] is a perspective view showing an outer appearance of an intake manifold having a freeze prevention arrangement for a PCV channel relating to a second embodiment.
Figure 5:
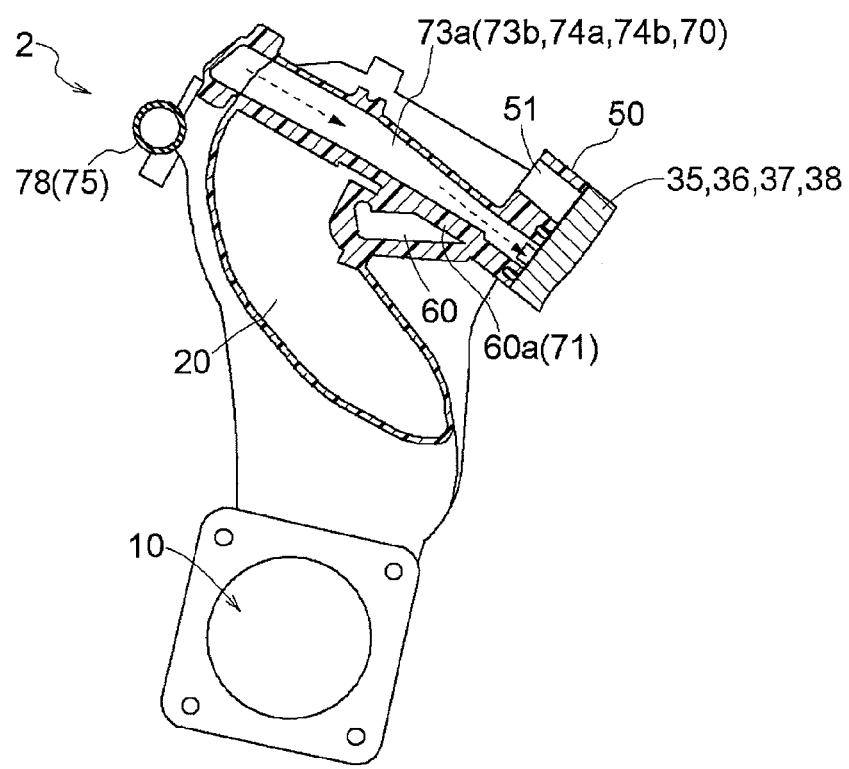
[FIG. 5] is a section view taken along a line V-V in FIG. 4.

Next, a second embodiment of the present invention will be explained in details with reference to the drawings. FIG. 4 is a perspective view showing an outer appearance of an intake manifold 2 having a freeze prevention arrangement for a PCV channel relating to the second embodiment. FIG. 5 is a section view taken along a line V-V in FIG. 4. In the following, in the instant embodiment, substantially identical arrangements as those of the first embodiment will be denoted with same reference marks and explanation thereof will be omitted.

What makes this embodiment differs most from the first embodiment is the position of the PCV channel 70. As shown in FIG. 4 and FIG. 5, the PCV channel 70 in the instant embodiment is disposed on the outer side (this may be referred to as "the back side" also) of the curves of the intake channels 31-34. The EGR channel 60 is disposed on the inner side of the curves of the intake channels 31-34, just like the first embodiment. As the mounting direction of the intake manifold 2 differs depending on the vehicle type, by forming the PCV channel 70 at a place not exposed to air current generated in association with traveling of the vehicle, there is obtained an effect of preventing temperature reduction of blowby gas during circulation.

In the instant embodiment, a PCV pipe 78 connected to the unillustrated crankcase is connected to the PCV channel 70 via a terminal end 75. The PCV channel 70 is bonded to the intake manifold body by vibration welding technique and integrated/unified as the intake manifold 2. The PCV channel 70 includes a common channel portion 72 which is a single channel and two branch channel portions 73, 74 branching from the common channel portion 72. In this embodiment, however, each branch channel portion 73, 74 is further branched into two portions. That is, the branch channel portion 73 includes two branch channels 73a, 73b. The branch channel portion 74 includes two branch channels 74a, 74. This means that each cylinder of the four-cylinder engine 80 has a branch channel for its own.

As shown in FIG. 5, the branch channels 73a, 73b, 74a, 74b (PCV channel 70) extend, toward the circulation direction of the intake channels 31-34, to the vicinity of the intake ports 35, 36, 37, 38 connected to the intake manifold 2. On the other hand, the EGR channel 60 has the same layout as the first embodiment and is disposed along the direction perpendicular to the circulation direction of the intake channels 31-34. Namely, the branch channels 73a, 73b, 74a, 74b are provided a positional relationship intersecting the EGR channel 60.

At the intersection portion, the outer walls of the branch channels 73a, 73b, 74a, 74b share a portion with the outer wall 60a of the EGR channel 60, thus having a heating portion 71. However, since the branch channels 73a, 73b, 74a, 74b intersect the EGR channel 60, the area of the heating portion 71 is smaller in comparison with the first embodiment, so there is possibility of reduction in the heating effect.

Then, in the instant embodiment, the branch channels 73a, 73b, 74a, 74b and the EGR channel 60 are caused to intersect at a position as close as possible to the intake ports 35-38, whereby the heated blowby gas is supplied to the intake ports 35-38, so that freeze of water content in the blowby gas can be prevented.

Industrial Applicability

The present invention is applicable to an intake manifold that requires a freeze prevention arrangement for a PCV channel in which blowby gas flows.

REFERENCE SIGNS LIST 1, 2 intake manifold
31, 32, 33, 34 intake channels
35, 36, 37, 38 intake ports
60 EGR channel
60a outer wall (EGR outer wall)
70 PCV channel
70a outer wall (PCV water wall)
71 heating portion
72 common channel portion
73, 74 branch channel portions
76, 77 blowby gas inlets
80 engine

The invention claimed is:

1. An arrangement for freeze prevention of a PCV channel, the arrangement comprising:
    a PCV channel connected to a plurality of intake channels that branch from a surge tank and positioned to return blowby gas containing un-combusted fuel gas as a main component and leaked into an engine to a plurality of intake ports provided in respective cylinders of the engine;
    an EGR channel returning exhaust gas exhausted from the engine to the intake ports;
    a heating portion as a common portion between a PCV outer wall of the PCV channel and an EGR outer wall of the EGR channel; and
    a length of the heating portion in a longitudinal direction spans, in a juxtaposing direction of the intake ports, from the intake port on one end side to the intake port on an other end side.

2. The arrangement for freeze prevention of a PCV channel according to claim 1, wherein the heating portion is disposed at a position which is upstream of and adjacent to a plurality of blowby gas inlets through which the blowby gas is introduced to the intake ports.

3. The arrangement for freeze prevention of a PCV channel according to claim 1, wherein the PCV channel includes a common channel portion which is a single channel and a plurality of branch channel portions which branch from the common channel portion and are connected to the intake ports; and
    wherein the heating portion is provided in the common channel portion.

4. The arrangement for freeze prevention of a PCV channel according to claim 1, wherein at least a portion of the EGR channel is provided between the PCV channel and the intake channels connected to the intake ports.

5. An intake manifold having the freeze prevention arrangement for a PCV channel according to claim 1, wherein the intake manifold is formed integral with the PCV channel and the EGR channel.

6. The arrangement for freeze prevention of the PCV channel according to claim 1, wherein the PCV channel includes a plurality of blowby gas inlets positioned to introduce the blowby gas to connection ports of the intake channels connected to the intake ports.

7. The arrangement for freeze prevention of the PCV channel according to claim 6, wherein
the EGR channel includes a plurality of EGR inlets for introducing EGR gas into the intake channels, and
each of the plurality of the blowby gas inlets is positioned between two of the plurality of EGR inlets.

8. An arrangement for preventing freezing of a PCV channel, the arrangement comprising:
a PCV channel positioned to return blowby gas, containing un-combusted fuel gas as a main component, to a plurality of intake ports provided in respective cylinders of an engine, the plurality of intake ports including a first intake port positioned between second and third intake ports on opposite end sides of the first intake port, the PCV channel possessing a PCV outer wall;
an EGR channel positioned to return exhaust gas exhausted from the engine to the intake ports, the EGR channel possessing an EGR outer wall;
a blowby gas heating portion positioned between the PCV outer wall of the PCV channel and the EGR outer wall of the EGR channel to heat blowby gas flowing along the PCV channel; and
the blowby gas heating portion possessing a length that spans, in a juxtaposing direction of the intake ports, from the second intake port to the third intake port so that the blowby gas in the PVC channel is heated throughout said length of the blowby gas heating portion.

9. The arrangement for freeze prevention of a PCV channel according to claim 8, wherein the heating portion is disposed at a position upstream of and adjacent to a plurality of blowby gas inlets through which the blowby gas is introduced to the intake ports.

10. The arrangement for freeze prevention of a PCV channel according to claim 8, wherein the PCV channel includes a common channel portion which is a single channel and a plurality of branch channel portions which branch from the common channel portion and are connected to the intake ports, and wherein the heating portion is provided in the common channel portion.

11. The arrangement for freeze prevention of a PCV channel according to claim 8, wherein at least a portion of the EGR channel is positioned between the PCV channel and the intake channels connected to the intake ports.

12. An intake manifold having the freeze prevention arrangement for a PCV channel according to claim 8, wherein the intake manifold is integral with the PCV channel and the EGR channel.

13. The arrangement for freeze prevention of the PCV channel according to claim 8, wherein the PCV channel includes a plurality of blowby gas inlets positioned to introduce the blowby gas to connection ports of the intake channels connected to the intake ports.

14. The arrangement for freeze prevention of the PCV channel according to claim 13, wherein
the EGR channel includes a plurality of EGR inlets for introducing EGR gas into the intake channels, and
each of the plurality of the blowby gas inlets is positioned between two of the plurality of EGR inlets.

\* \* \* \* \*